United States Patent [19]
Virtanen

[11] 4,228,382
[45] Oct. 14, 1980

[54] POWER REGULATING INVERTER CIRCUIT

[75] Inventor: Kalervo M. Virtanen, Lahti, Finland

[73] Assignee: Teknoware Oy, Lahti, Finland

[21] Appl. No.: 928

[22] Filed: Jan. 4, 1979

[30] Foreign Application Priority Data

Jan. 9, 1978 [FI] Finland .................................. 780060

[51] Int. Cl.³ ...................... H05B 41/29; H05B 41/40
[52] U.S. Cl. .................................... 315/219; 315/224; 315/DIG. 4; 331/112
[58] Field of Search ............... 315/219, 206, 224, 223, 315/DIG. 4, DIG. 7

[56] References Cited
U.S. PATENT DOCUMENTS

| | | | |
|---|---|---|---|
| 2,769,970 | 11/1956 | Kratville | 315/293 |
| 2,896,125 | 7/1959 | Morton | 315/DIG. 4 |
| 3,119,048 | 1/1964 | Tsuchiya | 315/206 X |
| 3,389,299 | 6/1968 | Bell | 315/206 |
| 3,514,668 | 5/1970 | Johnson et al. | 315/206 X |
| 3,573,544 | 4/1971 | Zonis | 315/206 |

*Primary Examiner*—Alfred E. Smith
*Assistant Examiner*—Charles F. Roberts
*Attorney, Agent, or Firm*—Fitch, Even & Tabin

[57] ABSTRACT

A means for regulating the power of a fluorescent tube in a vehicle supplied by a DC source by providing the control circuit of an oscillator transistor of an inverter with an adjustable RC circuit. Even very much dimmed tubes can be lighted with the use of a switch by-passing the RC circuit.

1 Claim, 1 Drawing Figure

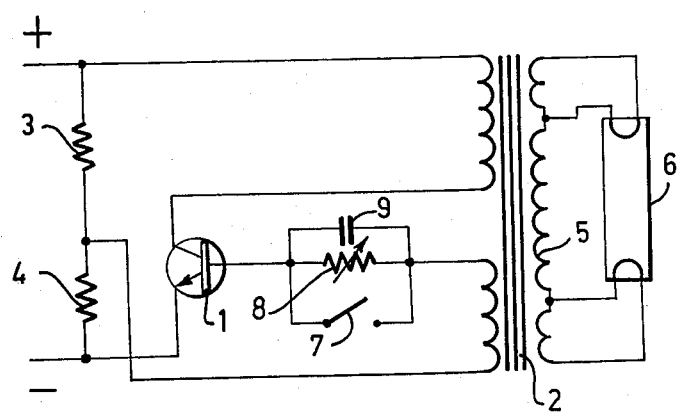

POWER REGULATING INVERTER CIRCUIT

This invention relates to a means for regulating the power in an electric apparatus, especially in a fluorescent lighting fixture, said means comprising an inverter connected to a DC source and including an oscillator transistor, the electric apparatus being connected after said inverter, and the control circuit of the oscillator transistor being provided with an adjustable RC circuit by means of which the base current of the oscillator transistor and, consequently, also the power taken by the inverter can be regulated. The means according to the invention is especially intended for use in vehicles in which the voltage of the DC source is too low for a discharge lamp. For example, a fluorescent tube requires for lighting and burning often a considerably higher voltage than that supplied by the current source (accumulator).

Fluorescent lamps in vehicles have so far most often been dimmed by lowering the supply voltage of the inverter by means of a voltage regulation resistor or a rheostat coupled before the inverter in the supply line.

The disadvantage in this method is that the rheostat, due to the big loss of current and power, of necessity, has been made unduly big-sized, in addition to which it has due to its high loss of power required a large and ventilated installation space. A self-oscillating inverter, moreover, has a tendency of reducing its frequency as the voltage decreases resulting in a disturbing noise when the voltage is lowered to a minimum.

These disadvantages have to a large extent been avoided by installing a control means, for example, an adjustable RC circuit not in the supply line but in the control circuit of the oscillator transistor of the inverter, the current whereof is considerably lower than that of the supply line. Due to this construction, the power control takes place with a better efficiency than earlier. Because the regulating circuit is located in the control circuit of the transistor, the fixed capacitor and adjustable resistance, i.e. the potentiometer, can be very small-sized, and their loss of power is very limited. The efficiency of the lighting fixture is good in the entire regulation area as no extra power is lost to the rheostat. As the frequency of the inverter is not substantially reduced while dimming the fluorescent tube and, accordingly, no disturbing noise occurs, the lifetime of the fluorescent tube can be prolonged considerably because the fluorescent tube, instead of being turned out, is dimmed. This fact is of importance, for example, in a vehicle trafficking in a densely populated area.

The present invention is intended mainly for use in vehicles, such as buses, in which fluorescent lights, for example, located in the ceiling of the car and reflecting from the windshield disturb the driver and endanger the traffic safety. Attempts have been made to alleviate this problem by placing shades in the front ends of the lamps, which for reasons of safety and appearance is not recommendable. In addition, it has often been possible to connect to the lamps a so-called night light which has usually covered all lamps.

It is the object of the present invention to provide a means by means of which the driver of a vehicle can simply by operating a current switch and pressing a button light the fluorescent lamps in a vehicle and have them dimmed to a predetermined dimming degree. This is possible owing to a switch by-passing the RC circuit. Normally, each fluorescent lamp has an inverter of its own, while a common current switch is positioned between the DC source and inverters and one common switch is connected in parallel with the RC circuits of the inverters. When the driver closes the current switch, all the fluorescent lamps are lighted the power whereof by means of the rheostat has been reduced, to not less than about one half of the full power. When he hereafter closes the switch by-passing the RC circuit, also the more dimmed fluorescent lamps are lighted, and as he thereafter opens the switch, for example, by releasing the press button, the control current passes through the RC circuit, the resistor whereof has been beforehand adjusted so that the lamp will have the required dimming degree. The dimming degree can, naturally, be adjusted for each lamp separately, as desired.

In this way, the driver can simply light the fluorescent lamps in the vehicle and make them emit light at the preadjusted dimming degree.

One preferred embodiment of the means according to the invention will now be described in more detail with reference to the accompanying drawing illustrating the wiring diagram of the inverter.

An oscillator transistor 1, a transformer 2, and resistors 3 and 4 form a freely oscillating oscillator or inverter. AC power is obtained from a secondary winding 5 of the transformer 2 to a load 6 comprising in the shown embodiment a fluorescent lamp. The control circuit of the oscillator transistor 1 is provided with an adjustable RC circuit comprising a potentiometer 8 and a capacitor 9 connected in parallel. This RC circuit is by-passed by a switch 7. In addition, there is a current switch (not shown) between the DC source and the coupling shown in the drawing.

In use, when the current switch is closed those fluorescent tubes in a bus which are regulated to full power and those which are dimmed to not less than about half power will be lighted. In order to light those tubes situated near the driver and therefore dimmed more than to about half the power the driver closes the switch 7 to lighten the tubes and then opens the switch, whereby the tubes burn with the dimmed light adjusted in advance with the potentiometer 8. By the adjustment of the resistance of the potentiometer 8, the base current of the transistor 1 is affected, whereby also the collector current of the transistor and the power transmitted to the load 6 change. When, for example, a dimming of the lamp is required, the resistance of the potentiometer 8 is increased, whereby the base current and, consequently, also the collector current of the transistor are reduced and the power transmitted to the load decreases.

It is to be noted that, in addition to the regulation of the lighting power of a fluorescent tube, the means is also applicable to the power regulation of other electric apparatuses. It should also be noted that the switch 7 is preferably common to all or a part of the RC circuits for the fluorescent tubes in a vehicle.

What I claim is:

1. In a motor vehicle having a plurality of independently adjustable fluorescent light tubes, a power regulating inverter circuit for use with each such tube, said inverter circuit comprising an oscillator transistor having an emitter, a collector and a base, a pair of resistors and a transformer all connected to form an inverter circuit having provisions for connections with a DC source on its input and an AC load on its output; an adjustable RC circuit including a potentiometer and a parallel connected capacitor connected to the base of said transistor for controlling the power transmitted to said transformer and any AC load connected thereto; and a switch connected across said RC circuit such that the entire RC circuit is bypassed when said switch is closed and is wholly in the circuit when said switch is open, whereby a momentary closing of said switch after the inverter is turned on will supply full power to said transformer and load while allowing said potentiometer to be set for a predetermined level of power to be supplied upon the opening of said switch following the momentary closing.

* * * * *